May 22, 1962 G. R. GWYNNE 3,035,952
HONEYCOMB STRUCTURE MACHINE
Original Filed Sept. 10, 1956 6 Sheets-Sheet 5

GEORGE R. GWYNNE
INVENTOR.
Huebner, Beehler, Worrel & Herzig.
BY
ATTORNEYS.

May 22, 1962  G. R. GWYNNE  3,035,952
HONEYCOMB STRUCTURE MACHINE
Original Filed Sept. 10, 1956  6 Sheets-Sheet 6

GEORGE R. GWYNNE
INVENTOR.
Huebner, Beehler, Worrel & Herzig.
BY
Vernon D. Beehler
ATTORNEYS.

United States Patent Office 3,035,952
Patented May 22, 1962

3,035,952
HONEYCOMB STRUCTURE MACHINE
George R. Gwynne, Long Beach, Calif., assignor, by direct and mesne assignments, to Douglas Aircraft Company, Inc., Santa Monica, Calif.
Continuation of application Ser. No. 609,007, Sept. 10, 1956. This application Oct. 26, 1959, Ser. No. 848,869
25 Claims. (Cl. 156—512)

This application is a continuation of my earlier application Serial No. 609,007, filed September 10, 1956, now forfeited.

The application relates to fabricating machinery and has particular reference to a machine by means of which packs of very thin sheet material can be formed glued together in a certain fashion so that when expanded they constitute a core of honeycomb-like structure which by application of sheet material to opposite ends of the open cells forming the core constitutes a composite sheet of light-weight reinforced material.

Honeycomb structure material has been developed over recent years to supply the need for a particularly lightweight and at the same time especially rigid sheet material adapted for use where great strength may be requisite without the attendant weight. Various methods and techniques have been employed heretobefore in producing honeycomb structure sheets. Initial attempts constituted no more than ways of constructing partitions or composite sheets of some fixed preselected thickness, length and width. More recently in an attempt to reduce the variety and type of machinery needed where such material had to be adapted to different specifications, certain systems have been employed, one of which constitutes the forming of a pack of sheets of material glued together so that when expanded they form a honeycomb core, provision being made for cutting the pack into a size smaller than that initially formed where occasions demand a core lesser in thickness than the maximum thickness for which such systems are designed. Needless to say, there are numerous disadvantages in necessitating cutting a pack of the initially formed material, one of which is the physical difficulty in cutting through multiple layers of sheet material such as paper in a manner sufficient to produce uniform and dependable results. It is also obvious that if such packs are to be made large enough to permit them being cut up to desired packs of smaller size, extremely heavy machinery would be necessary to make the packs of sufficient size in the first instance. This handicap is in addition to the handicap inherent in the actual handling of such large thick packs.

On other occasions the very nature of the material used to fasten the sheet material together along predetermined lines of adhesion adds greatly to the difficulty of cutting up large packs into small packs so as to obtain a core thickness of desired dimension while at the same time preserving a length and width in the finished article such as meets desired dimensions.

It is therefore among the objects of the invention to provide a new and improved machine for producing structural honeycomb material and especially structural honeycomb core material which is versatile to the point of making possible the production of any desired core thickness and length within the capacity of the machine by use of rolls of sheet material of pre-established width.

Another object of the invention is to provide a new and improved machine for the fabrication of a pack of honeycomb core material wherein the pack can be built up to a selected depth or thickness, thereby to eventuate in an over-all length in the finished article of a selected dimension and at the same time one capable of being set at will in such fashion that the breadth of the pack determines the desired thickness of the core once expanded and assembled into the finished article.

Still another object of the invention is to provide a new and improved machine for producing honeycomb core structure of selected core thickness and length which is adjustable to the extent of making the machine capable of varying the spacing between lines which determine the lines of adhesive contact between the sheets of material so that cell structures of much larger size, if desired, can be formed by the same piece of machinery.

A still further object of the invention is to provide a new and improved structural honeycomb machine which is capable of a number of adjustments, for example, an adjustment to determine the thickness of the core material, an adjustment to determine the cell structure, and an adjustment to determine the width of the band of adhesive between sheets of the material forming the structure, such adjustments being capable of incorporation into the machine operation with virtually a minimum amount of shut-down time and without the necessity of making any appreciable changes in the fixed mechanism of the machinery.

Still further among the objects of the invention is to provide a new and improved machine for the fabrication of honeycomb structure material which is rapid in its operation without likelihood of varying from a fixed selected core thickness and cell dimension and also a machine such as is equally effective in the fabrication of honeycomb structure material from different types of roll sheet material as, for example, paper, metal foil, sheet plastic material, etc., the machine further incorporating certain special structure at the point of shear capable of preventing whatever material might be used as an adhesive strip from spreading beyond the shearing knife edge, thereby to impair the rapid actuating effectiveness of the machinery.

With these and other objects in view, the invention consists in the construction, arrangement and combination of the various parts of the device whereby the objects contemplated are attained, as hereinafter set forth, pointed out in the appended claims and illustrated in the accompanying drawings.

In the form of the device chosen for the purpose of illustration the machine as a whole is one adapted to use of rolls 10 and 11 of sheet material 12 and 13 wherein the rolls may be from thirty to forty inches in length. Similarly in order to make use of rolls as big as those made reference to, the overall height of the machine will be as much as six feet and the length as much as about twelve feet. The machine is incorporated in a frame which is shown as resting on bed plates 14 and 15. Columns 16 and 17 support brackets 18 and 19 for the rolls 10 and 11. Columns 20, 21, and 22 on each side support corresponding rails 23 which comprise the framework for the lower portion of the machine. Columns 24, 25 and 26 together with the columns 16 and 17 support upper rails 27, thereby constituting an upper framework. Similarly columns 28 and 29 together with the column 25 support rails 30 and extensions 31 thereof, thereby constituting an intermediate framework. Ties 21' and 22' extending laterally across the frame assist in holding the columns in proper position.

Although a multiple number of rolls may be used in a machine of this general description, in the chosen form of the invention two rolls only are used mounted with exes parallel and horizontal on the brackets 18 and 19. The sheet material 12 from the roll 10 is passed over idler rollers 32 and 33 on the columns 26 and thereafter through what may be designated generally as a set 34 of rollers included among which are a pair of combined and applicating feed rollers 35 and 36. In this form of the invention the feed roller 36 may also be identified as an applicator roller in that it has mounted thereon a series of annular applicator rings 37 spaced evenly across the roller from one end to the other. A supply roller 38 rolls against the surfaces of the applicator ring and a regulator roller 39 in turn is adapted to roll against the circumference of the supply roller. It will further be noted that by use of a fixture 40 at each end, the spacing between the supply roller 38 and regulator roller 39 may be adjusted.

In the device here under consideration a relatively viscose adhesive materail is found advantageous. The material is contained in a sealed reservoir 41 under air pressure supplied through a line 42. The adhesive travels through an adhesive supply line 43 to a location between the regulator roller 39 and the supply roller 38. A valve 44 may be employed to regulate the supply of adhesive.

To determine the quantity of adhesive fed to the annular applicator rings 37, the spacing between rollers 38 and 39 is varied by manipulation of the fixture 40. Once set the adhesive will continue to flow evenly thereby to check the width of the adhesive strip applied to the sheet.

A tray 45 is employed mounted upon the rails 23 to catch material such as liquid adhesive or flux as may be carried between the rollers 38 and 39 as surplus and thence be led away through suitable tubing 46.

After the sheet 12 emerges from between the pair of feed rollers 35 and 36, it passes beneath an idler roller 47 on the columns 24 and thence to a location between feed rollers 35' and 36'.

To improve the effectiveness of the feed roller operation tilting brackets 50 are provided one at each end of the combined feed and applicating roller 35, these brackets being pivotally secured to the columns 24 by a pin 51. On each of the brackets is a bearing block 52 in which the shaft 53 of the roller is mounted. A link 54 is connected from a free end of the bracket 50 to a rotating block 55 rotatable about an axis 56 on a plate 57 by use of a handle 58. By manipulation of the handle, each end of the roller 35 can be elevated whenever it may be desired to thread the sheet 12 between the rollers 35 and 36 or for cleaning.

It is also possible to regulate the compressive force between the feed rollers 35 and 36 by manipulation of an adjusting screw 60, a shaft 61 of which extends downwardly to mounts. Adjustment of the feed rollers 35 and 36 with respect to each other is accomplished by substantially conventional means wherein the shaft 61 has oppositely threaded portions, not shown, engaging in adjusting blocks 63 and 64, the adjusting blocks 63 being part of the bearing block 52 and the adjusting block 64 being part of a bearing block 65. Hence when the adjusting screw 60 is rotataed in one direction or another, the respective feed rollers will either be separated or drawn together.

The sheet 13 from the roller 11 passes over idler rollers 70 on columns 26 and 71 and 72 on columns 24. This sheet 13 then passes to engagement with the sheet 12 at a location intermediate feed rollers 35' and 36'. It will be noted that the feed roller 36' is equipped with axially spaced annular applicator rings 37' which may be employed to pass material such as a liquid adhesive or flux material to the underside of the sheet 13.

It may be noted that the feed rollers 35' and 36' constitute rollers of a set 34' of rollers which in addition to the feed rollers include a supply roller 38' and a regulator roller 39'. The last identified rollers 38' and 39' are adjustable as to their distance one from another by means of an appropriate fixture 40. It will also be noted that the tilting bracket 50' at each end of the feed roller 35' may be employed through the agency of a roller block 55' to separate the rollers for feeding sheets of material between them when the roller block is manipulated by a handle 58'. Also for the set 34' there is provided an adjusting screw 60' and shaft 61' extending to the roller mounts for adjusting clearance between the feed rollers in the same manner as was described for the rollers 35 and 36.

Figures 5, 8, 8A:
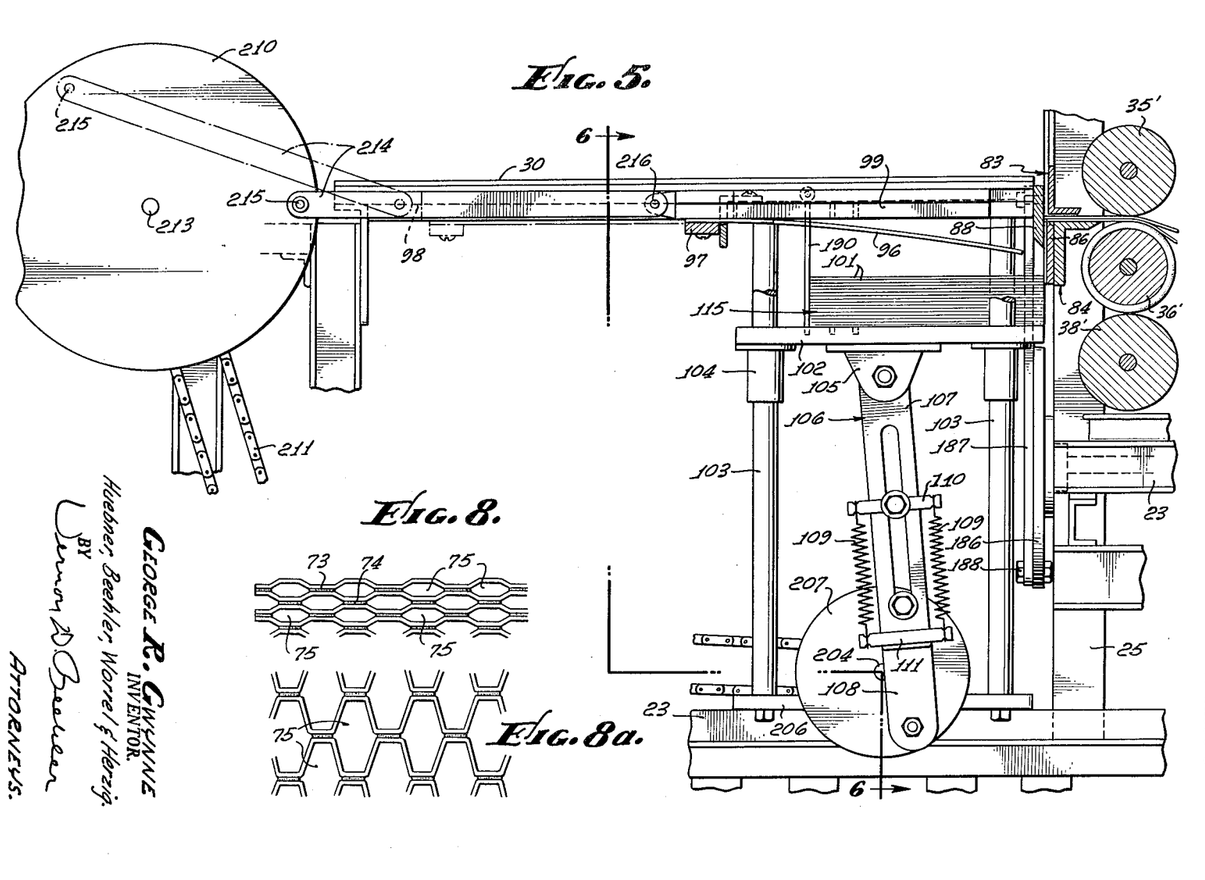
FIGURE 5 is a slightly enlarged fragmentary longitudinal view partly broken away showing that portion of the machine which incorporates the shear and the reciprocating table for reception of a pack of sheets of material.
FIGURE 8 is a fragmentary view showing the location of adhesive material applied in spaced strips to the sheet material.
FIGURE 8a is a view similar to FIGURE 8 but wherein only one-half the number of adhesive strips are applied to effect a lighter weight section of larger cell size.
Figure 7:
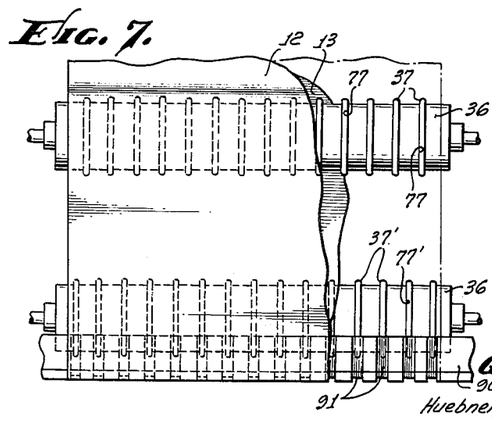
FIGURE 7 is a longitudinal sectional view taken on the line 7—7 of FIGURE 4.
Figure 7A:
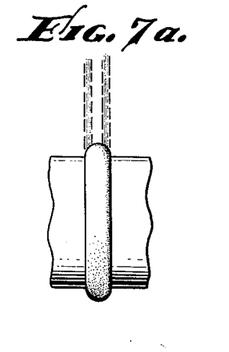
FIGURE 7a is a fragmentary elevational view showing the form of adhesive strip after application.

It is important to note that the annular applicator rings 37 on the feed roller 36 are offset with relation to the annular applicator rings 37' on the feed roller 36'. The spacing of the rings 37' is mid-way between the rings 37. This relationship is clearly shown in FIGURE 7. The spacing results in the location of adhesive strips 73 and 74 of appreciable width as shown in FIGURE 8 which makes possible the formation of the honeycomb cells 75 as viewed in FIGURE 8.

It will be noted in this connection also that the annular applicator rings 37 and 37' are removably mounted in corresponding annular grooves 77 and 77' on the respective feed rollers 36 and 36'. By being removably mounted as described, should it be desired to form cells 75 of double the size of those made possible by use of the number and arrangement of annular applicator rings illustrated in FIGURE 7, then alternate rings 37 may be removed and alternate rings 37' removed from the feed rollers 36', thereby cutting the number of adhesive strips in half spaced at double the distance and hence this spacing will be productive of the larger cell size. Further variation in cell size can be accomplished by removing the ring-carrying feed rollers 36 and 36' and substituting for them other ring-carrying feed rollers wherein the rings are differently spaced, without other change being necessary in the machine.

It will further be apparent that after material such as a liquid adhesive is applied to the underside of the sheet 12 and the sheet 13 by the respective applicator rings, the adhesive material may be spread to a degree determined by the spacing between the supply rollers 38, 38' and regulator rollers 39, 39', thereby to determine quantity of adhesive applied and hence the width of the adhesive strips 73, 74, as the case may be.

Inasmuch as the sheet 13 is pressed against the sheet 12 by pressure exerted during passage of these sheets together between the feed rollers 35' and 36', each strip will have a central area drier than the edges. Bonding of the sheets will therefore take place more rapidly at the central area and the sheets will emerge adhering together and will pass through an aperture 80 between plates 81 and 82 of angle sections 83 and 84. On the face of a leg 85 of angle section 84 is a stationary shear plate 86 of a shear 87, the movable plate of which is the plate 88 pivotally connected to the stationary plate 86 by means of a pin 89. It is important to note that the shear plate 86 at a cutting edge 90 is provided with a series of grooves 91, one of which is located in alignment with each of the annular applicator rings. It has been found good practice also to extend the grooves 91 along a vertical face 92 of the stationary shear plate. A cutting edge 93 of the movable shear plate 88 is straight and ungrooved but when the cutting edge passes the edge 90 of the stationary shear plate, a portion of the sheet material will be pushed into the groove, thereby forming in effect a dam across each line of adhesive. The formation of this dam by deformation of the sheet material squeezes any material forming the strip backwardly away from the engagement of the shearing edges, pinching off the material itself and effectively preventing any exudation of the material along the face 92 of the stationary shear blade. This effectively prevents a smearing or dirtying of the face and assures a constant clean-cut operation of the shear throughout long periods of continued use even though the material may be an extremely sticky and quick-setting adhesive.

The shear 87 may be set to operate after a predetermined length of the combined sheets 12 and 13 has passed through the aperture 80 and passed the vertical face 92 of the stationary shear plate 86. This combined section of the sheets 12 and 13 is initially received upon a set of fingers 96. These fingers 96 are supported on a horizontally reciprocating carriage 97, the path of reciprocation for which is generally illustrated in FIGURE 5. Rails 30 provide channels 98 within which blocks 99 on each side may move. The carriage 97 is secured to the right end of the block 99 as viewed in FIGURE 5.

When the fingers 96 are withdrawn by a suitable reciprocating motion of the carriage, sections 101 cut from the sheets 12 and 13 fall upon a vertically reciprocating table 102. Vertical posts 103 extending between rails 31 and 23 provide slideways or bushings 104 which in turn are secured to the table 102. On the underside of the table is a bracket 105 to which is attached a jointed drive arm 106 constituting an upper part 107 and a lower part 108. Heavy springs 109 attached to appropriate cross arms 110 and 111 normally extend the upper and lower parts 107 and 108 to full length but are subject to compression as the number of sections 101 build up, thereby increasing the depth of a pack 115 of sections of material which ultimately form the honeycomb core structure.

Important to the successful operation of the machine in producing honeycomb structures of different dimensions is the sequence of operation of the various movements in the machine. Generally speaking the movements consist first of drawing sheet material over the applicators and the shear so that it extends a suitable distance beyond the shear determining the ultimate thickness of the core, then shearing off the specified length of material and following these motions by a subsequent withdrawal of fingers 96 and upward movement of the table 102 to receive the sheared off composite sheet followed by withdrawal of the table downwardly. It will be clear that the shear cannot properly operate until movement of the sheet material has stopped. Correspondingly the shearing should be virtually completed before the table moves up to receive the sheared off sheet. To secure such sequence of operation an intermittent movement mechanism must be built into the machine.

Power is supplied from a single source by means of an electric motor 116. A base 117 of the motor is mounted upon a plate 118 in turn secured to the bed plates 14 and 15. A sprocket 120 on a motor shaft 119 drives a sprocket 122 on shaft 123 through chain 121. On the shaft 123 is a sprocket 124 from which a chain 125 drives a shaft 127 through the agency of sprocket 126. The shaft 127 secured by suitable bearing mounts 128 to one of the columns 22 supports a crank wheel 129.

A walking beam 130 is secured to the crank wheel 129 near its perimeter by means of a pin 131. The walking beam is employed to periodically rotate sprockets 132 and 133 as the walking beam reciprocates in opposite directions. Continued rotation of the crank wheel 129 in a predetermined continuous direction causes the walking beam to move reciprocatably first in one direction and then in the opposite direction. Because of travel of the end of the walking beam secured by the pin 131 around the perimeter of the crank wheel, the reciprocating movement will be of a somewhat composite nature rather than in a true back and forth direction.

Figure 2:
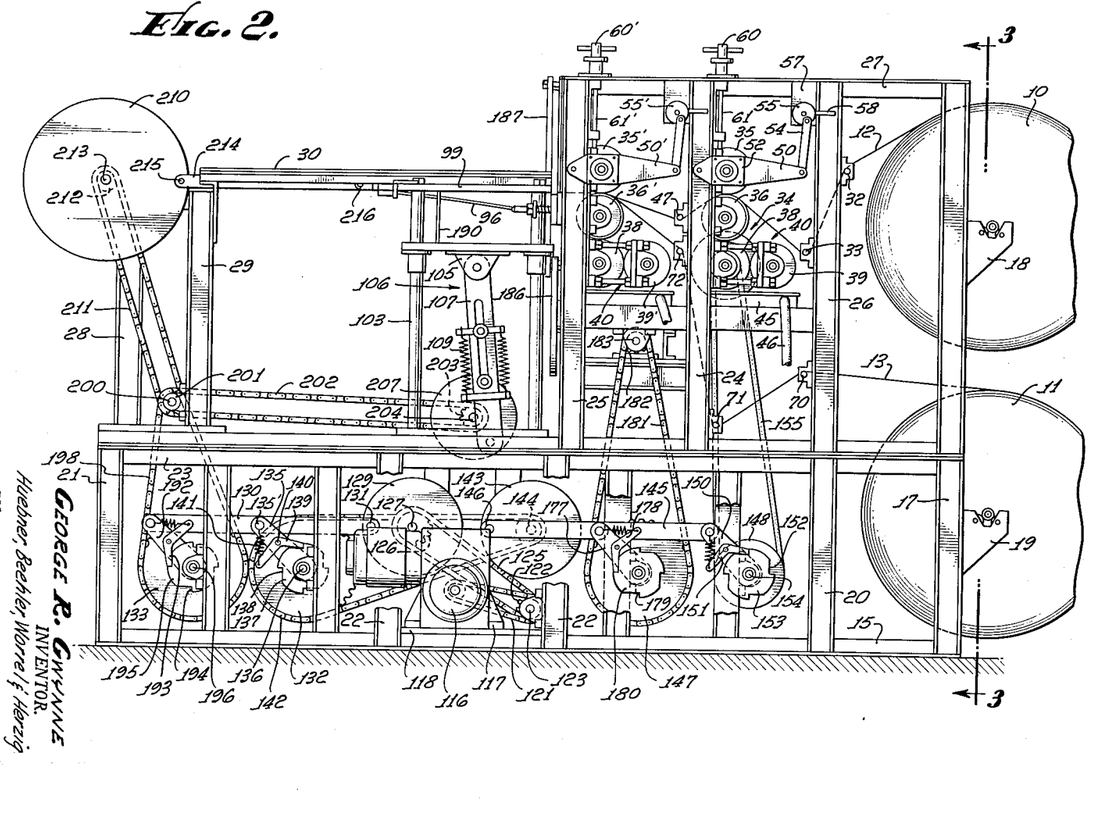
FIGURE 2 is a side elevational view of the machine on the side opposite from that illustrated in FIGURE 1.
Figure 3:
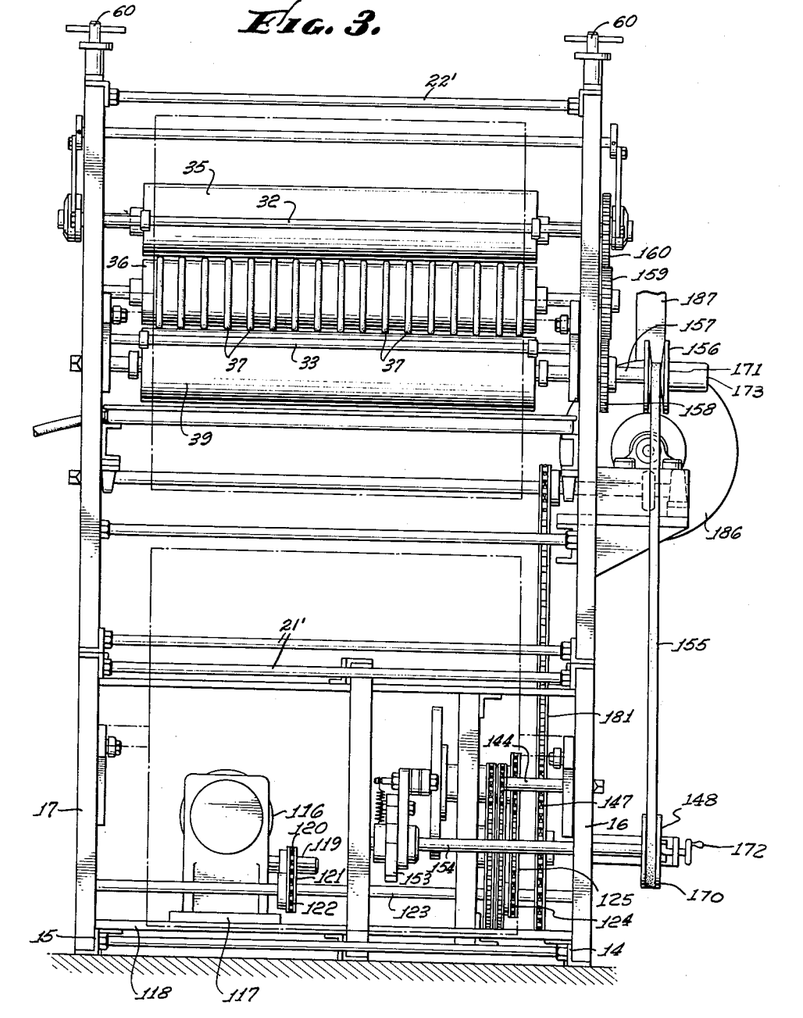
FIGURE 3 is an end elevational view taken on the line 3—3 of FIGURE 2.

For example, to rotate the sprocket 132 in a clockwise direction, as viewed in FIGURE 2, the walking beam 130 will be moving from left to right. Movement as described rotates a crank 135 secured by a pin 135' to the walking beam. The other end of the crank pivots about a shaft 136 which is the shaft on which the sprocket 132 is mounted. A ratchet 137 on the sprocket wheel 132 contains a series of four notches 138 into which an end edge of a bell crank 139 engages. The bell crank is pivotally mounted by means of a pin 140 upon the crank 135. A spring 141 tends to urge the bell crank in engagement with one or another of the notches. Hence when the walking beam 130 moves from left to right, the sprocket wheel will be rotated an angular distance corresponding to movement of the crank 135 as it shifts in position one notch. When the walking beam returns from right to left, the bell crank will ratchet over the ratchet 137 until it engages the next successive notch.

The sprocket 132 is employed by means of a chain 142 to rotate another crank wheel 143. This last identified crank wheel 143 mounted on shaft 144 serves to reciprocate a second walking beam 145, the beam being secured by a pin 146 to the crank wheel 143 adjacent its perimeter.

Reciprocation of the walking beam 145 alternately rotates sprocket 147 and pulley 148, respectively, in opposite directions.

For example, it is necessary first to advance the sheet 12 through the junction of feed rollers 35 and 36. This is acomplished by movement of a crank 150 clockwise, as viewed in FIGURE 2, and the crank by use of a bell crank 151 pivotally mounted thereon moves into an appropriate notch 152 of the ratchet 153 thereby to rotate the sprocket 148. The sprocket 148 mounted as shown on its shaft 154 serves through a chain 155 to rotate a supply roller 38 in clockwise direction, as viewed in FIGURE 2. Rotation is accomplished by means of a sprocket 156 on a shaft 157 on which is a gear 158.

The gear in turn causes counter-clockwise rotation of feed roller 36, as viewed in FIGURE 2, or clockwise, as viewed in FIGURE 1.

Figure 1:
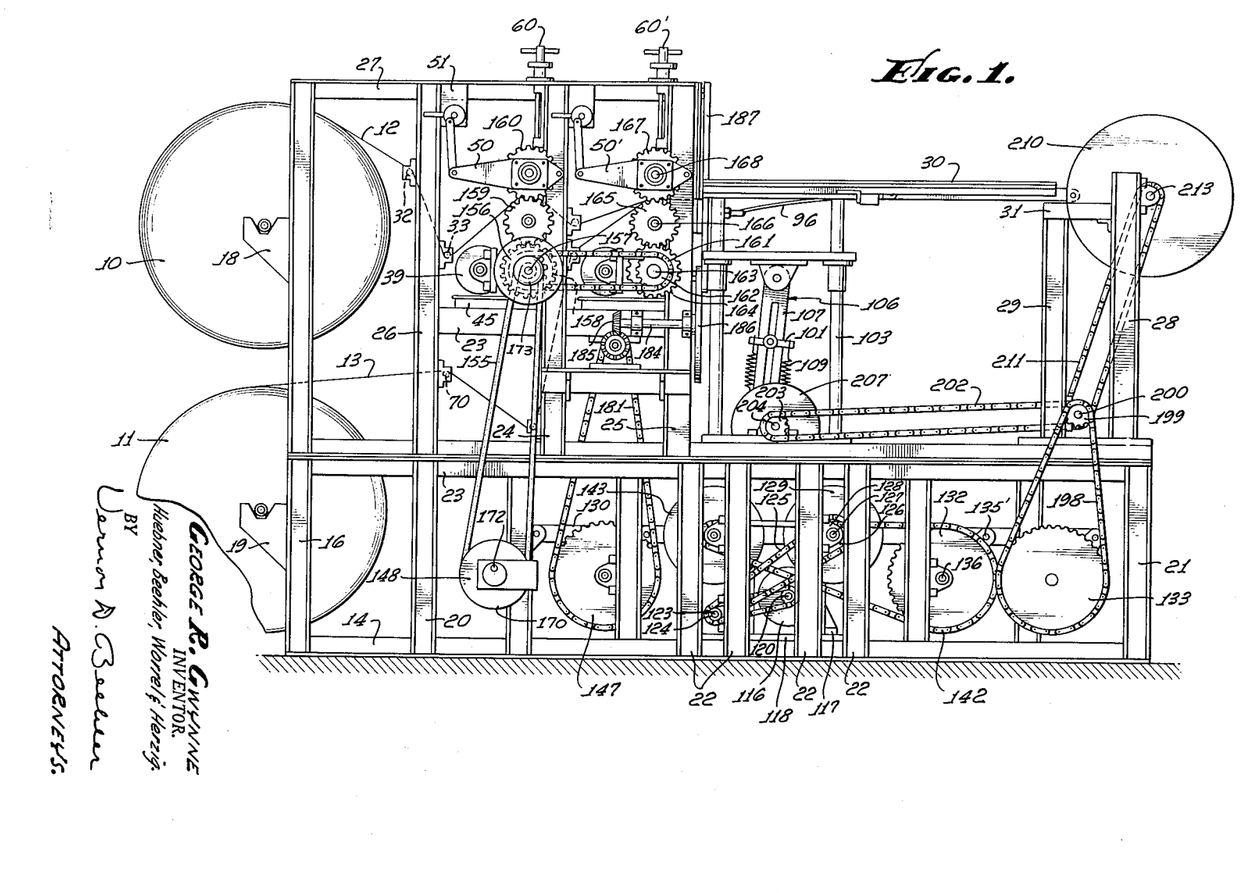
FIGURE 1 is a side elevational view of the honeycomb structure machine illustrative of the invention and loaded with rolls of sheet material ready for operation.

Similarly, as viewed in FIGURE 1, a gear 159 on the feed roller 36 rotates the feed roller clockwise, or counterclockwise, as viewed in FIGURE 2. At the same time through the agency of a gear 160 feed roller 35 is rotated clockwise, as viewed in FIGURE 2, and inasmuch as the sheet 12 of material is passing between rollers 35 and 36, it will be advanced in a direction from right to left. During its advance annular applicator rings 37 may apply a material, such as an adhesive material or flux to the sheet 12 of material coming from the roll 10. The sheet 12 extends forwardly between feed rollers 35' and 36'.

Figures 4, 9:
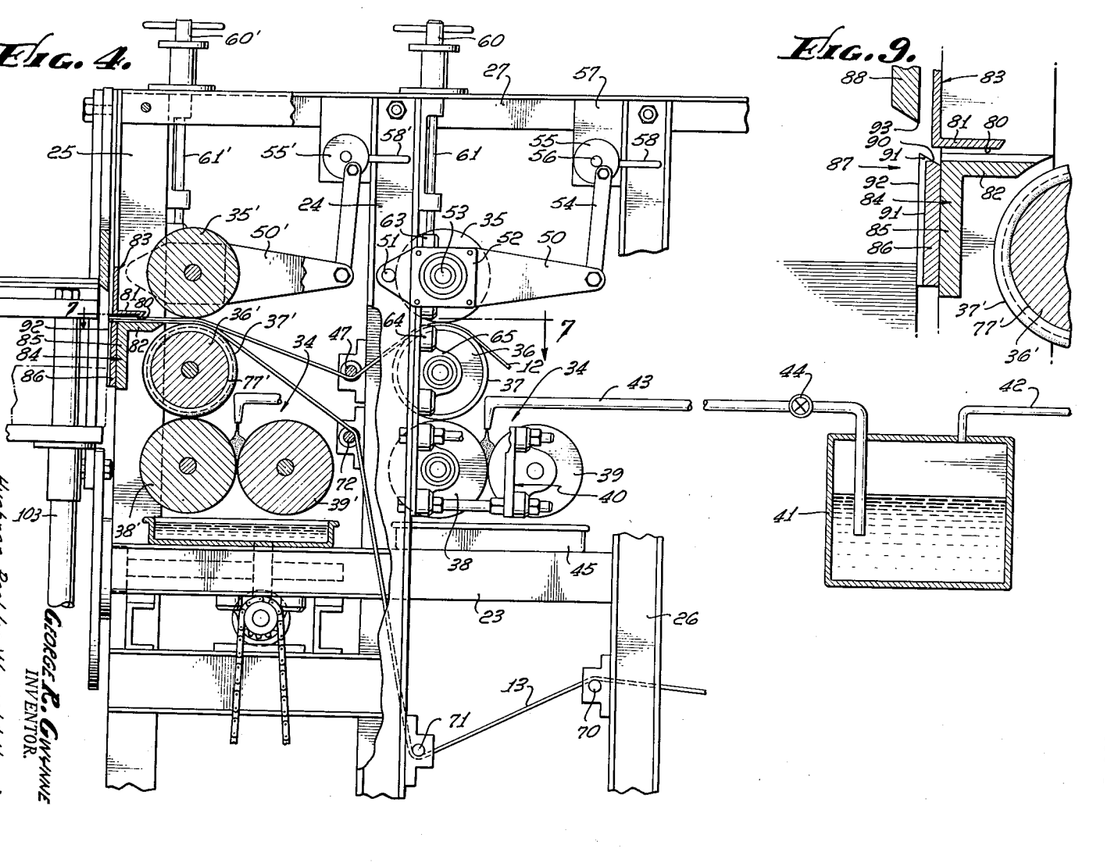
FIGURE 4 is an enlarged longitudinal view partially broken away showing in particular the sets of applicator and feed roll means by which the sheet material from the roll is fed to the shear.
FIGURE 9 is a fragmentary longitudinal sectional view through the shear.

Sheet 13 joins sheet 12 at a location between the feed rollers 35' and 36'. These feed rollers are rotated, as viewed in FIGURE 2, so as to feed both sheets 12 and 13 from right to left across the shear or more particularly the stationary shear blade 92. See FIGURE 4 for further details.

To cause the feed rollers 35' and 36' to rotate in the desired direction a chain 161 is driven by an appropriate sprocket on shaft 157 so as to rotate sprocket 162 on shaft 163. On the same shaft is a gear 164 meshing with a gear 165 which in turn rotates the feed roller 36' mounted as it is on shaft 166. Simultaneously a gear 167 on shaft 168 is rotated, thereby to rotate the feed roller 35' in a direction contrary to the direction of rotation of the feed roller 36'. Rotation of the feed rollers 35', 36' is simultaneously and at the same rate as rotation of rollers 35, 36. Hence these two sets of rollers work together to advance the sheet material 12 and 13 over the plate 31 and over the stationary shear blade or plate 86. How far the sheet material will be advanced at its cycle depends on the ratio between the pulley 148 and pulley 156. A variation in rate of rotation is accomplished by employment, for example, of a variable drive which in the chosen example is illustrated as a Reeves drive. The pulleys 148 and 156 are adapted to be varied as to their effective diameters by a shift of the side plates 170, 171 which form shaped recesses in the pulleys, the shift being accomplished in a well-known manner as by rotating a crank 172 on the pulley 148. Change in tension on the belt 155 causes the plate 171 of the pulley 156 to move in a reverse direction under the influence of a spring device 173 resulting in a corresponding change in the effective rate of rotation of the driven pulley 156.

It will be clear further that the advance of the sheet material 12 and 13 will be periodic and will occur only during reciprocating movement of the working beam 145 in a direction from left to right, as viewed in FIGURE 2.

Figure 6:
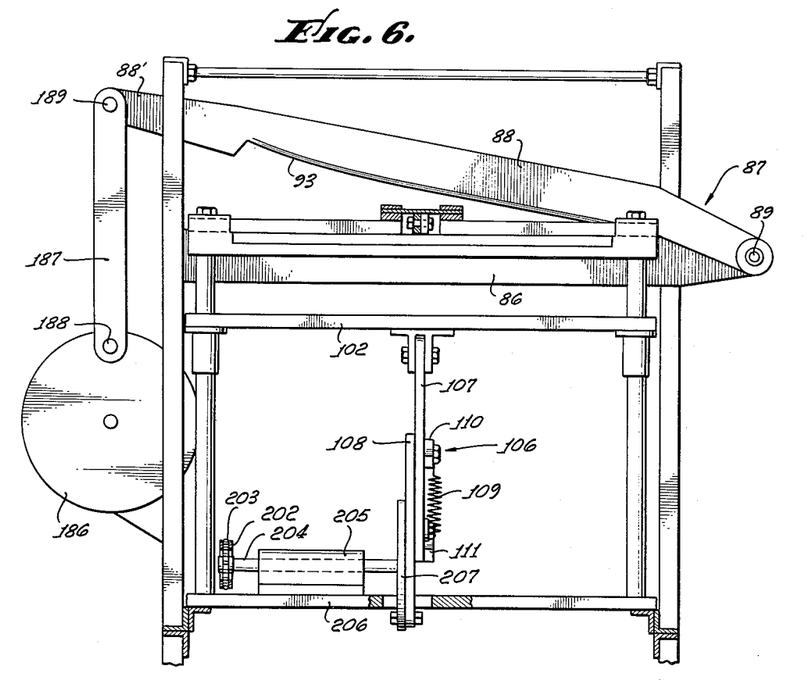
FIGURE 6 is a cross-sectional view taken on line 6—6 of FIGURE 5.

To manipulate the movable shear plate 88 a crank 177 operates upon reciprocation of the walking beam 145 in a direction from right to left of FIGURE 2 to move a bell crank 178 in a direction engaging one or another of notches 179 in a ratchet 180. The ratchet in turn causes the sprocket 147 to rotate and advance a chain 181 which passes over a sprocket 182 on a shaft 183. As shown to good advantage in FIGURE 1, a stub shaft 184 is rotated by operation of a bevel gear 185 meshing with a similar bevel gear (not shown) on the shaft 183. Rotation of stub shaft 184 rotates a crank wheel 186 which, as shown in FIGURE 6, causes reciprocating substantially vertical movement of a crank arm 187. The crank arm is pivoted by a pin 188 to the crank wheel at its lower end and pivotally secured by a pin 189 at its upper end to a free end 88' of the movable shear blade 88.

From the sequence just described it will be clear that while the sheets 12 and 13 are being advanced by movement of the walking beam 145 in a direction from left to right as viewed in FIGURE 2, the movable shear plate is stationary. Movement of the sheets is then permitted to come to a rest as the walking beam 145 moves in a contrary direction and it is during this last movement that the movable shear plate is reciprocated through a cutting stroke, thereby to cut off a predetermined length of sheets 12 and 13.

As the sheets emerge from the shear they are designed to rest temporarily upon the fingers 96. To assist in establishing a proper position for the pieces of sheet material once sheared stops 190 may be provided. These stops 190 may be placed at various locations with respect to a horizontal position on the table 102, depending on how much of a portion of sheet material 12, 13 is to be advanced before shearing takes place.

So that each section 101 of the sheets falls into proper position upon the table 102, the table is elevated. When the table is at the top of its elevated movement fingers 96 must be withdrawn to release the appropriate section 101. Movement of the fingers accordingly must be timed with movement of the table. Both of these motions must be timed with respect to the time of shear or cut off. This is accomplished by rotation of the sprocket 133 at a time when the sprocket 132 is not rotating. Since actuation of the shear and movement of the sheets 12 and 13 depend upon rotation of the sprocket 132, those actions will not be taking place when the sprocket 133 is moving. Movement of the last identified sprocket is accomplished by rotation of a crank 192 in a counter-clockwise direction as viewed in FIGURE 2 by motion of the walking beam 130 from right to left. The crank in turn moves a bell crank 193 in a direction engaging one or another of notches 194 of a ratchet 195. Rotation of the ratchet 195 mounted as it is on a shaft 196 causes the sprocket 133 to rotate and this in turn rotates a shaft 197 through the agency of a chain 198 and sprocket 199. The sprocket is keyed to a shaft 200 on which a sprocket 201 by means of a chain 202 rotates a sprocket 203 on shaft 204. The shaft 204 secured in a bearing housing 205 mounted in turn upon a beam 206 has mounted at its opposite end a crank wheel 207. Attached to the crank wheel 207, as best seen in FIGURES 5 and 6, is the lower part 108 of a drive arm 106 for the table 102. As the crank wheel 207 rotates counterclockwise, for example, as viewed in FIGURES 2 and 5, the cross arm 110 will be elevated. Through the springs 109 the cross arm 111 will also be elevated and this will lift upon the bottom of the upper part 107 of the drive arm 106. Hence the table 102 will be moved upwardly but the extent of its movement will be cushioned by action of the springs 109. Therefore, as the number of sections 101 build up so that the pack 115 grow in thickness from top to bottom, by action of the springs 109 no jamming will occur.

It will be noted that the pack 115 as viewed in FIGURE 5 is so located that a right-hand edge 112 is in alignment with the face of the stationary shear plate 86. Accordingly the sections 101 as they are cut from the sheets 12 and 13 are guided at one edge by the posts 190 and at the other edge by the face of the shear plate, thereby to maintain all of the sections precisely positioned in the pack as the table 102 reciprocates to receive them.

Another crank wheel 210 is driven from the same shaft 200 as the crank wheel 207. This is accomplished by employment of a chain 211 passing over a sprocket 212 on shaft 213, upon which shaft is also located the crank wheel 210. Another sprocket (not shown) but located on the shaft 200 engages the opposite end of the chain 211. A crank arm 214 secured by a pin 215 to the crank wheel 210 is connected by means of a pin 216 to the block 99 to which the carriage 97 is secured. Hence as the crank wheel 210 is rotated in a counter-clockwise direction as viewed in FIGURES 2 and 5, at which time the table 102 is being elevated, the crank arm 214 will move from right to left as viewed in FIGURES 2 and 5, pulling the carriage 97 and block 99 in the same direction, which movement will at the same time withdraw the fingers 96 from their positions beneath the section 101. As the table reaches the top of its movement, the topmost section 101 will then fall into place upon the other sections and will be guided into a proper position between stops 190 on one side and appropriate structure comprising the shear on the other side. Pressure of the springs 109 against the sections 101 should they be treated with glue as an adhesive will tend to accelerate adhesion between all of the sections so that by the time the pack is complete the adhesive material will have set sufficiently to permit removal of the pack.

On those occasions where flux might be applied by comparable action, the flux will have been pressed into a desired position between adjacent sheets of material ready for fusing by some appropriate conventional fusing technique.

From the foregoing description and accompanying drawings it will be noted that the thickness of the pack 115 can be built up to varying amounts up to the capacity of the machine. This build up can be timed to a precise amount in order to eventuate in a structural honeycomb assembly having a height depending upon the number of sections 101 of sheets 12, 13, that may be desired. As previously noted by applying fewer strips of adhesive the same number of sections can be made to eventuate in a structural honeycomb sheet virtually twice as high. The width of the sheet will of course be determined by, at least in part, the length of the rolls 10 and 11 of sheet material which length will naturally be affected by the number of adhesive strips employed and the breadth or width of those strips. Simply stated, if the packing is stretched considerably in a vertical direction, it will shrink a corresponding amount from side to side.

The thickness of the ultimate structural honeycomb material will depend upon the horizontal dimension of the pack visible in FIGURE 5. This in turn is dependent upon how fast the sheet material 12 and 13 is advanced between cycles of the shear operation. This again in turn depends upon the setting of the variable drive. By a proper selection of variable drive by means of which the rate of travel of the sheets is slow, short cores can be built up. This means that only a short length of the sections 101 will accumulate one on top of the other after shearing. Because of the variable drive being infinitely variable any core length for the structural honeycomb material can be produced within the limits of capacity of the machine. This moreover can be accomplished at any time during machine operation without the necessity of making any changes in the machine operation other than to make a new setting for the variable drive. Suitable stop positions for the stops 190 can be provided to accommodate any setting of the variable drive. It will accordingly be apparent that the pack 115 can be varied in two ways at any time during machine operation either to make a difference in the core thickness or a difference in the height of the structural honeycomb which results. The versatility is further extended to the changing of the number and spacing of the annular applicator rings, thereby to vary the number and spacing of adhesive strips. Varying the cell size in this fashion coupled with the adjustments herein referred to, evidences a structural honeycomb machine capable of producing practically any desired type of structure. This aided by the damming effect of the grooves on the stationary shear plate completes the structure of a machine which can run continuously without jamming and which can be shifted almost at will to produce structural honeycomb of any desired character.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A machine for producing structural honeycomb cores of selected length from rolls of sheet material of established width comprising a frame, racks at one end of the frame for said rolls, a first pair of feed rollers on the frame adapted to receive sheet material from one of said rolls, one of said feed rollers having a series of axially spaced annular applicators adapted to contact a face of the sheet material of said one roll, a second pair of feed rollers on the frame adapted to receive sheet material from both said one roll and a second roll, one feed roller of said second pair having a series of annular applicators adapted to contact a face of material from said second roll, said last series of annular applicators being axially spaced at locations alternating with said first annular applicators, the sheets being fed in parallel relation and the applicators applying the adhesive respectively to one confronting and one non-confronting surface of the sheet material, a shear on the frame having a stationary shear blade in the path of said sheet material emerging from said second pair of feed rollers, an intermittent drive jointly for said pairs of feed rollers adapted at each cycle to advance a selected length of material from said rolls over said stationary shear blade, a vertically reciprocating table adjacent said stationary shear blade adapted to receive said selected lengths of material, actuators respectively for said shear and said table interconnected with said intermittent drive in operation sequence wherein shear operation occurs when the drive is at rest and table operation occurs subsequent to shear operation, and temporary holding means for said selected length of material during the shearing operation.

2. A machine for producing structural honeycomb cores of selected thickness and length from rolls of sheet material of established width comprising a frame, parallel racks at one end of the frame for said rolls, a first pair of feed rollers on the frame adapted to receive sheet material from one of said rolls, one of said feed rollers having a series of axially spaced annular applicators adapted to contact a face of the sheet material of said one roll, a second pair of feed rollers on the frame adapted to receive sheet material from both said one roll and a second roll, one feed roller of said second pair having a series of annular applicators adapted to contact a face of material from said second roll, said last series of annular applicators being axially spaced at locations alternating with said first annular applicators, the sheets being fed in parallel relation and the applicators applying the adhesive respectively to one confronting and one non-confronting surface of the sheet material, a shear on the frame in the path of said sheet material emerging from said second pair of feed rollers, an intermittent drive jointly for said pairs of feed rollers adapted at each cycle to advance a selected length of material from said rolls over said shear, a speed adjuster in said intermittent drive adapted to selectively vary said selected length of material, and a table adjacent said shear adapted to receive said selected lengths of material, an actuator for said shear interconnected with said intermittent drive in operation sequence wherein shear operation occurs when the drive is at rest.

3. A machine for producing structural honeycomb cores of selected thickness and length from rolls of sheet material of established width comprising a frame, parallel racks at one end of the frame for said rolls, a first pair of feed rollers on the frame adapted to receive sheet material from one of said rolls, one of said feed rollers having a series of axially spaced annular applicators adapted to contact a face of the sheet material of said one roll, a second pair of feed rollers on the frame adapted to receive sheet material from both said one roll and a second roll, one feed roller of said second pair having a series of annular applicators adapted to contact a face of material from said second roll, said last series of annular applicators being axially spaced at locations alternating with said first annular applicators, the sheets being fed in parallel relation and the applicators applying the adhesive respectively to one confronting and one non-confronting surface of the sheet material, a shear on the frame having a stationary shear blade in the path of said sheet material emerging from said second pair of feed rollers adapted at each cycle to advance a selected length of material from said rolls over said stationary shear blade, a speed adjuster adapted to selectively vary said selected length of material, a table adjacent said shear adapted to receive said selected lengths of material, an actuator for said shear interconnected with said intermittent drive in operation sequent wherein shear operation occurs when the drive is at rest, and temporary holding means for said selected length of material during each shearing operation.

4. A machine for producing structural honeycomb cores of selected thickness and length from rolls of sheet material of established width comprising a frame, parallel racks at one end of the frame for said rolls, a first pair of feed rollers on the frame adapted to receive sheet material from one of said rolls, one of said feed rollers having a series of axially spaced annular applicators adapted to contact a lower face of the sheet material of said one roll, a second pair of feed rollers on the frame adapted to receive sheet material from both said one roll and a second roll, one feed roller of said second pair having a series of annular applicators adapted to contact a lower face of material from said second roll, said last series of annular applicators being axially spaced at locations alternating with said first annular applicators, adjustable pressure means effective on both said pairs of feed rollers, a shear on the frame having a stationary shear blade in the path of said sheet material emerging from said second pair of feed rollers, an intermittent drive jointly for said pairs of feed rollers adapted at each cycle to advance a selected length of material from said rolls over said stationary shear blade, a speed adjuster in said intermittent drive adapted to selectively vary said selected length of material advanced during operation of the feed rollers, a vertically reciprocating table adjacent said stationary shear blade adapted to receive said selected lengths of material, actuators respectively for said shear and said table interconnected with said intermittent drive in operation sequence wherein shear operation occurs when the drive is at rest and table operation occurs subsequent to shear operation and while the drive is at rest, temporary holding means receptive of said selected lengths of material during the shearing operation, and an actuator for said holding means interconnected with the actuator for said table whereby the holding means is removed when the table is moved to receive each successive selected length of material.

5. A machine for producing structural honeycomb cores of selected thickness and length from rolls of sheet material of established width comprising a frame, racks on the frame for said rolls, a succession of pairs of feed rollers on the frame adapted to receive sheet material from said rolls, means adapted to apply a series of spaced strips of adhesive material to the sheet material alternately spaced with respect to sheets from different rolls, the sheet material being fed in parallel relation and the strips of adhesive material being applied to one of the confronting surfaces of the sheet material and to one of the non-confronting surfaces thereof, a shear in the path of sheet material emerging from said feed rollers, alternately operating intermittent drives respectively for said shear and for said feed rollers having a selectively variable speed adjusting means therein independent of the drive for said shear whereby to vary the lengths of sheet material presented to the shear thereby to selectively vary the thickness of said honeycomb structure cores.

6. A machine for producing structural honeycomb cores of selected thickness and length from rolls of sheet material of established width comprising a frame, parallel racks on the frame for said rolls, a succession of pairs of feed rollers on the frame adapted to receive sheet material from said rolls, means adapted to apply series of alternately spaced strips of adhesive material to faces of said sheet material, the sheet material being fed in parallel relation and the strips of adhesive material being applied to one confronting and one non-confronting surface of the sheet material, a shear in the path of sheet material emerging from said feed rollers, a reciprocating table adapted to receive successively sheared lengths of sheet material in a stack on said table, a source of power, a drive for said table and alternately operating intermittent drives respectively for said shear and for said feed rollers connected to said source of power, the drive for said feed rollers having a selectively variable speed adjusting means therein independent of the drive for said shear and for said table whereby to vary the lengths of sheet material presented to the shear thereby to selectively vary the thickness of said honeycomb structure cores.

7. A machine for producing structural honeycomb cores of selected thickness and length from rolls of sheet material of established width comprising a frame, parallel racks on the frame for said rolls, a first pair of feed rollers on the frame adapted to receive sheet material from one of said rolls, a second pair of feed rollers on the frame adapted to receive sheet material simultaneously from both said one roll and a second roll, means adapted to apply a series of spaced strips of adhesive material to one of the confronting and one of the non-confronting surfaces of the sheet material, the strips of one series alternating with the strips of the other series, a shear path of sheet material emerging from said second pair of feed rollers, a reciprocating table adapted to receive successively sheared lengths of sheet material in a stack on said table, a stop for said sheared lengths of sheet material selectively adjustable to different lengths, a source of power, a drive for said table and alternatively operating intermittent drives respectively for said shear and for said feed rollers connected to said source of power, the drive for said feed rollers having a selectively variable speed adjusting means therein independent of the drive for said shear and for said table whereby to vary the lengths of sheet material presented to the shear thereby to selectively vary the thickness of said honeycomb structure cores.

8. A machine for producing structural honeycomb cores of selected thickness from rolls of sheet material of established width comprising a frame, racks on the frame for said rolls, a succession of pairs of feed rollers on the frame adapted to receive sheet material from said rolls, means adapted to apply alternately spaced series of strips of liquid adhesive to a corresponding face of the sheet material from each of said rolls, a shear including a stationary shear blade having a cutting edge and a vertical face thereof in the path of said sheets of material emerging from said feed rollers, said stationary shear blade having a series of spaced grooves at the vertical face thereof with one groove in alignment with each strip of adhesive, and a moving blade of said shear adapted during a shearing stroke to impress a portion of said sheet material into each of said grooves thereby to cut off passage of said adhesive to the vertical face of said stationary shear blade.

9. A machine for producing structural honeycomb cores of selected thickness from rolls of sheet material of established width comprising a frame, parallel horizontal racks on the frame for said rolls, a first pair of feed rollers on the frame adapted to receive sheet material from one of said rolls, means adapted to apply a series of spaced strips of liquid adhesive to a face of said sheet material, a second pair of feed rollers on the frame adapted to receive sheet material simultaneously from both said one roll and a second roll with the adhesive therebetween, means adapted to apply a series of spaced strips of liquid adhesive to the outer face of sheet material from said second roll, a shear including a horizontal stationary shear blade having a horizontal edge and an outer vertical face thereof in the path of said sheets of material emerging from said second pair of feed rollers, said stationary shear blade having a series of spaced vertical grooves at the vertical edge thereof with one groove in alignment with each strip of adhesive, each said groove extending across the vertical edge of said stationary shear blade, and a moving blade of said shear adapted during a shearing stroke to impress a portion of said sheet material into each of said grooves thereby to cut off passage of said adhesive to the vertical face of said stationary shear blade.

10. A machine for producing structural honeycomb cores of selected cell proportioning and thickness from rolls of sheet material of established width comprising a frame, parallel racks on the frame for said rolls, a sequence of sets of rollers on the frame each including a pair of oppositely rotating feed rollers adapted to receive sheet material from one of said rolls, one of the correspondingly positioned feed rollers of each pair having a series of axially spaced annular grooves therein, annular applicators removably mounted in said grooves, a container for a source of joining material adjacent said annular applicators, said applicators being adapted to apply spaced strips of said joining material to the face of said sheet material, a material feeding means in contact with said applicators, a severing device for cutting off sections of sheet material from said sets of rollers after application of said joining material thereto, and means for stacking successive sections of said sheet material in adhesive relationship to each other.

11. A machine for producing structural honeycomb cores of selected cell proportioning and thickness from rolls of sheet material of established width comprising a frame, parallel racks on the frame for said rolls, a first set of rollers on the frame including a pair of upper and lower feed rollers adapted to receive sheet material from one of said rolls, the lower feed roller having a series of axially spaced annular grooves therein, annular applicators removably mounted in said grooves adapted to apply spaced strips of material to the lower face of said sheet material, a material feed roll in contact with said applicators, a second set of rollers on the frame including a pair of upper and lower feed rollers adapted to receive sheet material simultaneously from both said one roll and a second roll with the sheet material from the second roll being lowermost, the lower feed roller of said second set having a series of axially spaced annular grooves therein located intermediate the grooves of the lower feed roller of said first set of feed rollers, annular applicators removably mounted in said last grooves, alternate applicators of the respective lower feed rollers being removable thereby to vary the spacing distance of strips of material on said respective sheet material.

12. A machine for producing structural honeycomb cores of selected cell proportioning and thickness from rolls of sheet material of established width comprising a frame, parallel racks on the frame for said rolls, a sequence of sets of rollers on the frame each including a pair of opposite feed rollers adapted to receive sheet material from one of said rolls, one of the correspondingly positioned feed rollers of each pair having a series of axially spaced annular grooves therein, annular applicators removably mounted in said grooves adapted to apply spaced strips of material to the lower face of said sheet material, a material feed roll in contact with said applicators and a material regulator adapted to selectively determine the amount of material carried by said feed roll to the applicators, alternate applicators of the respective annularly grooved feed rollers being removable thereby to vary the spacing distance of strips of material on said sheet material.

13. A machine for producing structural honeycomb core packs of selected depth and breadth from rolls of sheet material of established width comprising a frame, parallel racks on the frame for said rolls, a succession of pairs of feed rollers on the frame each independent of the other and each adapted to receive a separate sheet of material from one of said rolls, means adapted to apply series of alternately spaced strips of material to one confronting and one non-confronting face of said sheet material from said rolls, a shear in the path of sheet material emerging from said feed rollers, a vertical mount on the frame adjacent said shear, a table of breadth adapted to accommodate the core pack of maximum breadth reciprocatably mounted on said mount, a compressible support beneath said table adapted to compress with accumulation of sheets on said table to a selected depth, and an intermittent reciprocating drive for said table.

14. A machine for producing structural honeycomb core packs of selected depth and breadth from rolls of sheet material of established width comprising a frame, parallel racks on the frame for said rolls, a succession of pairs of feed rollers on the frame adapted to receive sheet material from said rolls, a shear in the path of sheet material emerging from said feed rollers, a vertical mount on the frame adjacent said shear, a table of breadth adapted to accommodate the core pack of maximum breadth reciprocatably mounted on said mount, a compressible support beneath said table adapted to compress with accumulation of sheets on said table to a selected depth and an intermittent reciprocating drive for said table, a set of temporary sheet receivers above said table adapted to initially receive sheet material emerging from said shear, an intermittent horizontally reciprocating drive for said receivers, said intermittent drives having alternating operation whereby said receivers are retracted when said table is elevated for reception of said sheets.

15. A machine for producing structural honeycomb core packs of selected depth and breadth from rolls of sheet material of established width comprising a frame, racks on the frame for said rolls, a first pair of feed rollers on the frame adapted to receive sheet material from one of said rolls, means adapted to apply a series of spaced strips of material to a face of sheet material from said one roll, a second pair of feed rollers on the frame adapted to receive sheet material simultaneously from both said one roll and a second roll, means adapted to apply a series of strips of material to a face of material from said second roll on a side opposite to that to which material is applied to said first sheet and at spaced locations alternating with strips on said first sheet, a shear in the path of sheet material emerging from said second pair of feed rollers, a vertical mount on the frame adjacent said shear, a table of breadth adapted to accommodate the core pack of maximum breadth reciprocatably mounted on said mount, a compressible drive arm beneath said table adapted to compress with accumulation of sheets on said table to a selected depth and an intermittent reciprocating drive for said arm, a set of fingers above said table adapted to initially receive sheet material emerging from said shear, an intermittent horizontally reciprocating drive for said fingers, said intermittent drives having alternating operation whereby said fingers are retracted when said table is elevated for reception of said sheets.

16. A machine for producing structural honeycomb cores from a supply of sheet material comprising a frame, a first pair of feed rollers on the frame adapted to receive a strip of said sheet material, means comprising a series of axially spaced applicators adapted to contact a face of the strip of sheet material, a second pair of feed rollers on the frame adapted to receive a second strip of sheet material, means comprising a series of axially spaced applicators adapted to contact a face of said second strip of sheet material, said last series of applicators being axially spaced at locations alternating with said first series of applicators, said applicators being positioned to contact a corresponding surface of each of the strips of sheet material, a shear in the path of sheet material emerging from said feed rollers operating in a selected timed sequence whereby to cut off sections of said sheet material of equal length, means for collecting and stacking said successive sections of sheet material to produce a core of selected thickness.

17. A machine for producing structural honeycomb cores from a supply of sheet material comprising a frame, a first pair of feed rollers on the frame adapted to receive a strip of sheet material, means comprising a series of axially spaced applicators adapted to contact a face of the strip of sheet material, a second pair of feed rollers on the frame adapted to receive a second strip of sheet material, means comprising a series of axially spaced applicators adapted to contact a face of said second strip of sheet material corresponding with the contacted face of the first said strip of sheet material, said last series of applicators being axially spaced at locations alternating with said first series of applicators, a shear in the path of sheet material emerging from said feed rollers operating in a selected timed sequence whereby to cut off sections of said sheet material of equal length, means for collecting and stacking said successive sections of sheet material to produce a core of selected thickness, and means connected to said feed rollers for varying the speed of travel of said strips of sheet material to said shear and thereby the length of said sections cut by the shear whereby to vary the thickness of the core.

18. A machine for producing structural honeycomb cores of selected length from a supply of sheet material comprising a frame, a first pair of feed rollers on the frame adapted to receive a strip of said sheet material, means comprising a series of axially spaced applicators adapted to contact a face of the strip of sheet material, a second pair of feed rollers on the frame adapted to receive said strip of sheet material and a second strip of sheet material, means comprising a series of axially spaced applicators adapted to contact a face of said second strip of sheet material corresponding with the contacted face of the first said strip of sheet material, said last series of applicators being axially spaced at locations alternating with said first series of applicators, a shear in the path of sheet material emerging from said second pair of feed rollers operating in a selected timed sequence whereby to cut off sections of said sheet material of equal length, means for collecting and stacking said successive sections of sheet material to produce a core of selected thickness, and means connected to said feed rollers for varying the speed of travel of said strips of sheet material to said shear and thereby the length of said sections cut by the shear whereby to vary the thickness of the core.

19. A machine for producing structural honeycomb cores of selected thickness from rolls of sheet material of established width comprising: a frame; racks on the frame for said rolls; feed roller means on the frame adapted to receive sheet material from said rolls and including means adapted to apply two series of spaced strips of adhesive material to the sheet material from said rolls, said series being applied respectively to confronting and non-confronting surfaces of the sheet material, each of said series being alternately spaced with respect to the other; a shear in the path of sheet material emerging from said feed roller means; alternately operating drives respectively for said shear and for said feed roller means having a selectively variable adjusting means for controlling said feed roller means whereby to vary the lengths of sheet material presented to the shear thereby to selectively vary the thickness of said honeycomb structure cores.

20. A machine for producing structural honeycomb cores of selected thickness from rolls of sheet material of established width comprising: a frame; racks on the frame for supporting said rolls; feed roller means on said frame receiving sheet material from said rolls and including means applying two series of spaced strips of adhesive material to the sheet material, each of said series being alternately spaced with respect to the other and being respectively on confronting and non-confronting surfaces of the sheet material; a shear in the path of sheet material emerging from said feed roller means; means intermittently moving said shear across the path of the sheet material; means for driving said feed roller means, the last said means effecting an interrupting in the feed of sheet material when said shear is moving across the path of sheet material.

21. A machine for producing structural honeycomb cores of selected thickness and length from rolls of sheet material of established width comprising a frame, parallel racks on the frame for said rolls, a succession of pairs of feed rollers on the frame adapted to receive sheet material from said rolls and including means adapted to apply series of alternately spaced strips of material to confronting and non-confronting faces of said sheet material, a shear traversing the path of sheet material emerging from said feed rollers, a reciprocating table adapted to receive successively sheared lengths of sheet material in a stack on said table, a drive for said table and shear, intermittent drive for said feed rollers and being idle when said shear is traversing said path, the drive for said feed rollers having a selectively variable adjusting means whereby to vary the lengths of sheet material presented to the shear thereby to selectively vary the thickness of said honeycomb structure cores.

22. A machine for producing structural honeycomb cores of selected cell proportioning and thickness from rolls of sheet material of established width comprising a frame, parallel racks on the frame for said rolls, a first set of rollers on the frame including a pair of upper and lower feed rollers adapted to receive sheet material from one of said rolls, one of said feed rollers having a series of axially spaced annular applicators mounted thereon adapted to apply spaced strips of adhesive material to one face of said sheet material from said one of said rolls, a second set of rollers on the frame including a pair of upper and lower feed rollers adapted to receive sheet material simultaneously from both said one roll and a second roll, one of said feed rollers of said second set having a series of axially spaced annular applicators mounted thereon and being spaced alternately of the applicators in the other of said series and being adapted to apply adhesive material to another face of the sheet material from said rolls, the adhesive being applied respectively to a confronting and a non-confronting surface of the sheet material, and means supplying adhesive material to all of the applicators.

23. A machine for producing structural honeycomb cores of selected cell proportioning and thickness from rolls of sheet material of established width comprising a frame, parallel racks on the frame for said rolls, a sequence of sets of rollers on the frame each including a pair of opposed fed rollers adapted to receive sheet material from said rolls, one of the feed rollers of each pair having a series of axially spaced annular applicators mounted thereon and being adapted to apply spaced strips of adhesive material to different faces of said sheet material, an adhesive material feed means supplying said applicators, alternate applicators of the respective feed rollers being removable thereby to vary the spacing distance of strips of adhesive material on said sheet material, the applicators of one series being alternately located with respect to the applicators of the other series and the applicators be positioned to apply adhesive to one confronting and on non-confronting surface of the sheet material.

24. A machine for producing structural honeycomb core packs of selected depth and breadth from rolls of sheet material of established width comprising a frame, parallel racks on the frame for said rolls, a succession of pairs of feed rollers on the frame for said rolls, means adapted to supply series of alternately spaced strips of material respectively to confronting and non-confronting faces of said sheet material from said rolls, a shear in the path of and adapted to sever the sheet material emerging from said feed rollers, a table of breadth adapted to accommodate the core pack of maximum breadth reciprocatably mounted on said frame adjacent said shear, a compressible support for said table adapted to compress under an accumulation of sheets on said table to a selected depth, and a reciprocating drive for said table.

25. A machine for producing structural honeycomb cores from a supply of sheet material comprising a frame, a first pair of feed rollers on the frame adapted to receive a strip of said sheet material, means comprising a series of axially spaced applicators adapted to contact a face of the strip of sheet material, a second pair of feed rollers on the frame adapted to receive a second strip of sheet material, means comprising a series of axially spaced applicators adapted to contact a face of said second strip of sheet material, said last series of applicators being axially spaced at locations alternating with said first series of applicators, said applicators being arranged to respectively contact one confronting and one non-confronting surface of the sheet material, a shear in the path of sheet material emerging from said feed rollers operating in a selected timed sequence whereby to cut off sections of said sheet material of equal length, and means for collecting, stacking and compressing said successive sections of sheet material to produce a core of selected thickness.

References Cited in the file of this patent

UNITED STATES PATENTS 2,451,175   Resberg   Oct. 17, 1948

UNITED STATES PATENT OFFICE
CERTIFICATE OF CORRECTION

Patent No. 3,035,952                                       May 22, 1962

George R. Gwynne

It is hereby certified that error appears in the above numbered patent requiring correction and that the said Letters Patent should read as corrected below.

Column 1, line 25, for "heretobefore" read -- heretofore --; column 3, line 21, for "exes" read -- axes --; column 4, line 5, for "rotataed" read -- rotated --; column 7, line 21, for "working" read -- walking --; column 13, line 45, for "separte" read -- separate --; column 16, line 20, for "fed" read -- feed --; line 32, for "on" read -- one --.

Signed and sealed 11th day of September 1962.

(SEAL)
Attest:

ERNEST W. SWIDER
Attesting Officer

DAVID L. LADD
Commissioner of Patents